United States Patent
Hild et al.

(10) Patent No.: US 12,286,820 B2
(45) Date of Patent: Apr. 29, 2025

(54) MODULAR ACTUATING DEVICE, VEHICLE, AND METHOD

(71) Applicant: Huf Hülsbeck & Fürst GmbH & Co. KG, Velbert (DE)

(72) Inventors: Sven Hild, Hagen (DE); Steffen Leib, Ratingen (DE); Yevgen Dementyev, Wuppertal (DE); Igor Alexander Gorenzweig, Wuppertal (DE); Andreas Gornik, Gevelsberg (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 294 days.

(21) Appl. No.: 17/794,563

(22) PCT Filed: Feb. 1, 2021

(86) PCT No.: PCT/EP2021/052276
§ 371 (c)(1),
(2) Date: Jul. 21, 2022

(87) PCT Pub. No.: WO2021/156187
PCT Pub. Date: Aug. 12, 2021

(65) Prior Publication Data
US 2023/0066181 A1 Mar. 2, 2023

(30) Foreign Application Priority Data
Feb. 5, 2020 (DE) ............... 10 2020 102 897.0

(51) Int. Cl.
*E05B 81/64* (2014.01)
*E05F 15/73* (2015.01)
(Continued)

(52) U.S. Cl.
CPC .............. *E05B 81/64* (2013.01); *E05F 15/73* (2015.01); *G01V 3/088* (2013.01); *G01V 3/10* (2013.01); *B60R 25/24* (2013.01)

(58) Field of Classification Search
CPC ......... E05B 81/64; E05F 15/73; G01V 3/088; G01V 3/10; B60R 25/24
(Continued)

(56) References Cited

U.S. PATENT DOCUMENTS

2022/0325565 A1* 10/2022 Leonardi ................. E05F 15/43

FOREIGN PATENT DOCUMENTS

EP 0582969 A1 2/1994
WO WO2006060745 A2 6/2006
(Continued)

OTHER PUBLICATIONS

Translation of WO-2018091199-A1 (Year: 2018).*
(Continued)

*Primary Examiner* — Nathaniel T Woodward
(74) *Attorney, Agent, or Firm* — Christian S. Hans; Bret E. Field; Bozicevic, Field & Francis LLP

(57) ABSTRACT

The invention relates to an actuating device (10) for triggering a function of a vehicle (1) by a user, having an electronics unit (12) with a sensor unit (20) for detecting an actuation action (200) of the user for triggering the function of the vehicle (1), an electronics outer side (12.2) on which the actuation action (200) of the user can be detected by the sensor unit (20), and an electronics inner side (12.1) which is opposite the electronics outer side (12.2). Furthermore, the invention relates to a vehicle (1), as well as to a method (100).

19 Claims, 6 Drawing Sheets

Figure 1:
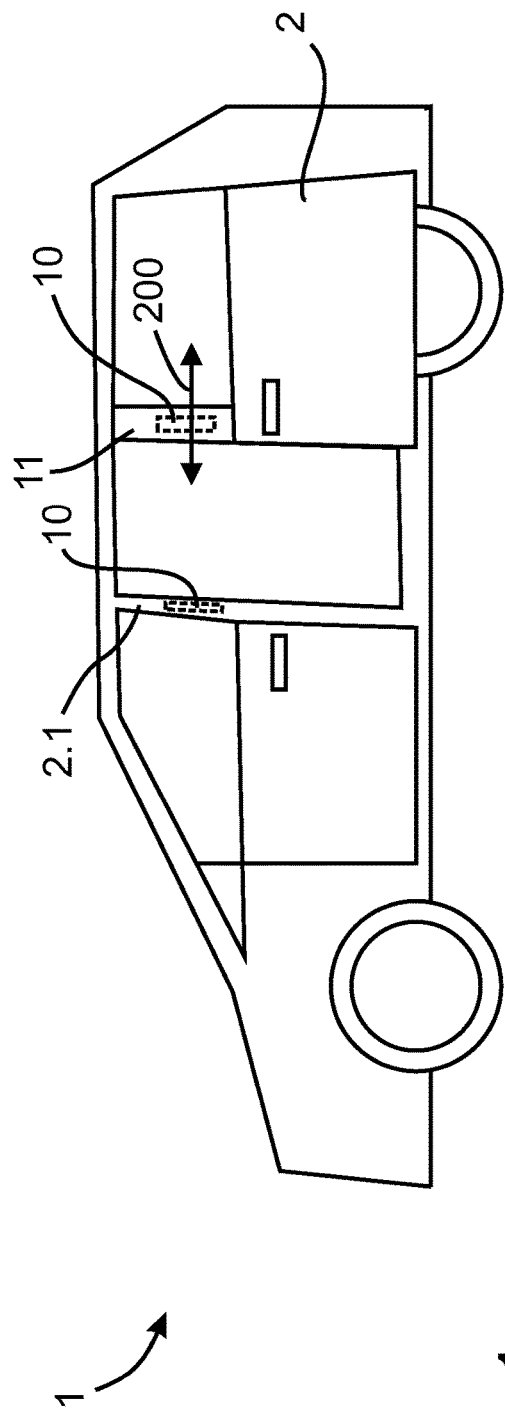

(51) Int. Cl.
*G01V 3/08* (2006.01)
*G01V 3/10* (2006.01)
*B60R 25/24* (2013.01)

(58) Field of Classification Search
USPC .......................................................... 73/431
See application file for complete search history.

(56) References Cited

FOREIGN PATENT DOCUMENTS

WO     WO2011007008 A2    1/2011
WO     WO-2018091199 A1 *   5/2018  ............. E05B 81/77

OTHER PUBLICATIONS

Office Action for Chinese Patent Application No. 202180007435.7 dated Feb. 9, 2024, and its English translation, 26 pages.
Office Action for European Application No. 21702995.8 mailed on Jul. 7, 2023, with its English Translation, 6 pages.
Office Action for Chinese Patent Application No. 202180007435.7 dated Jul. 26, 2024, and its English translation, 18 pages.

* cited by examiner

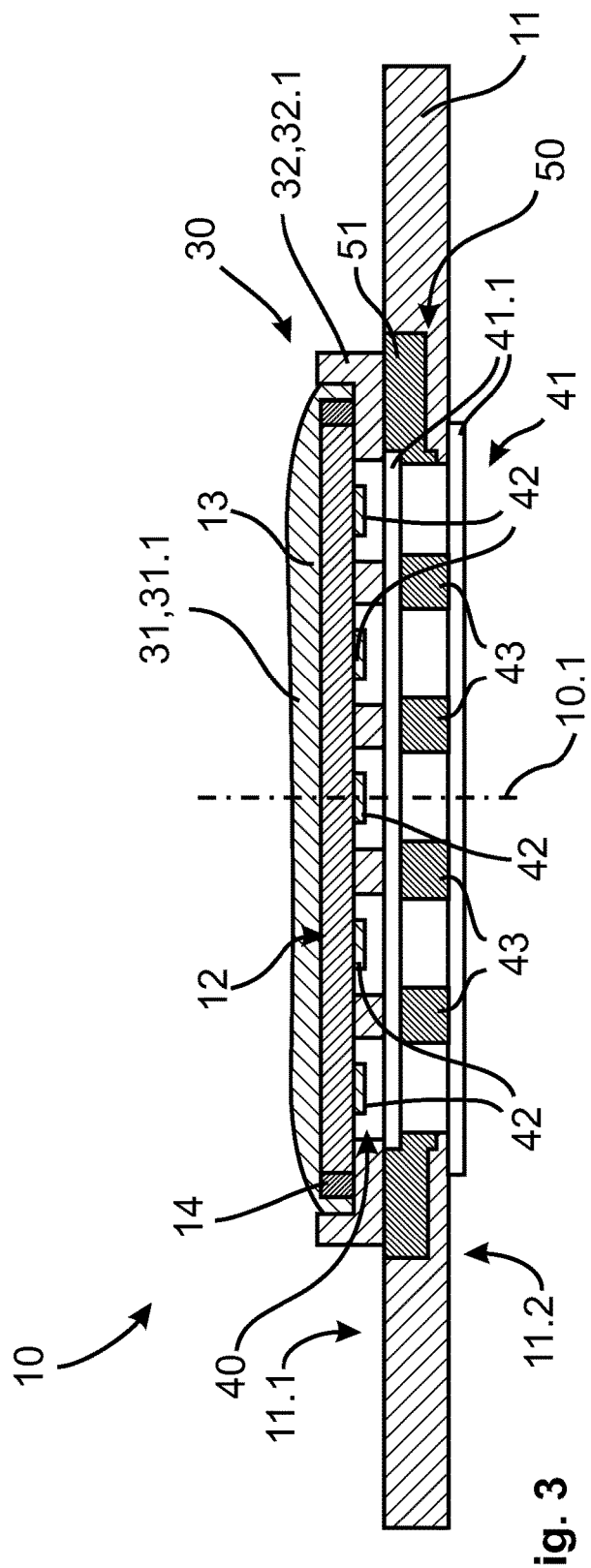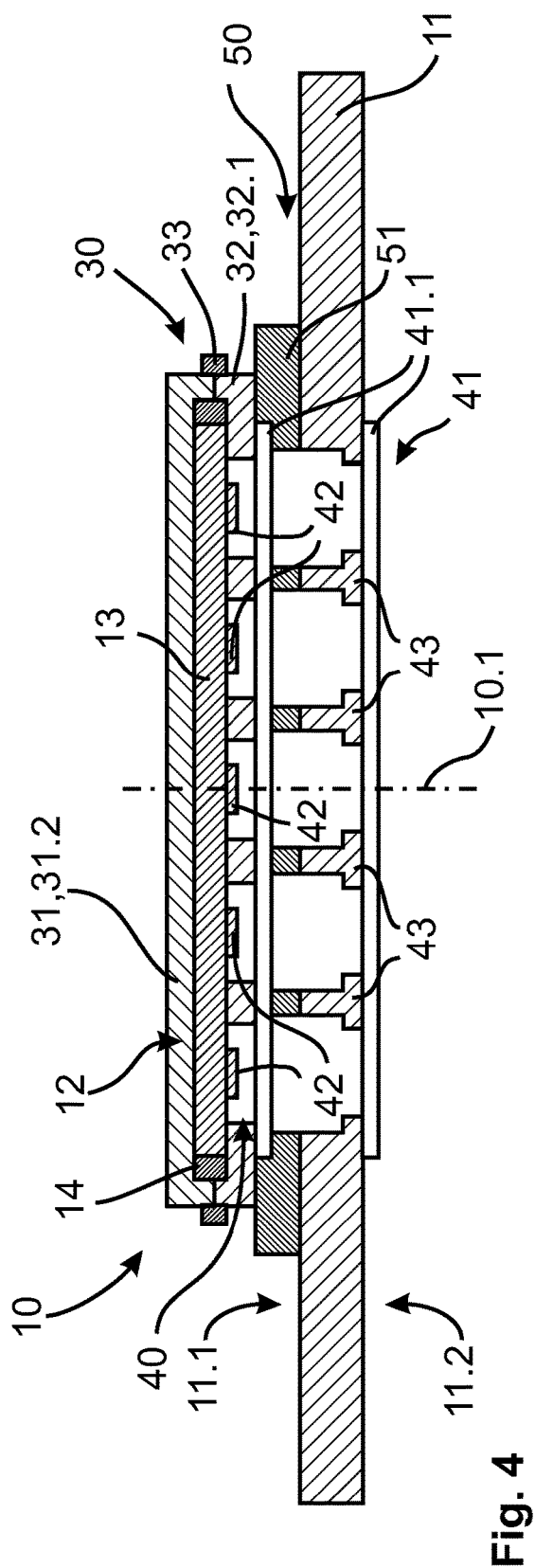

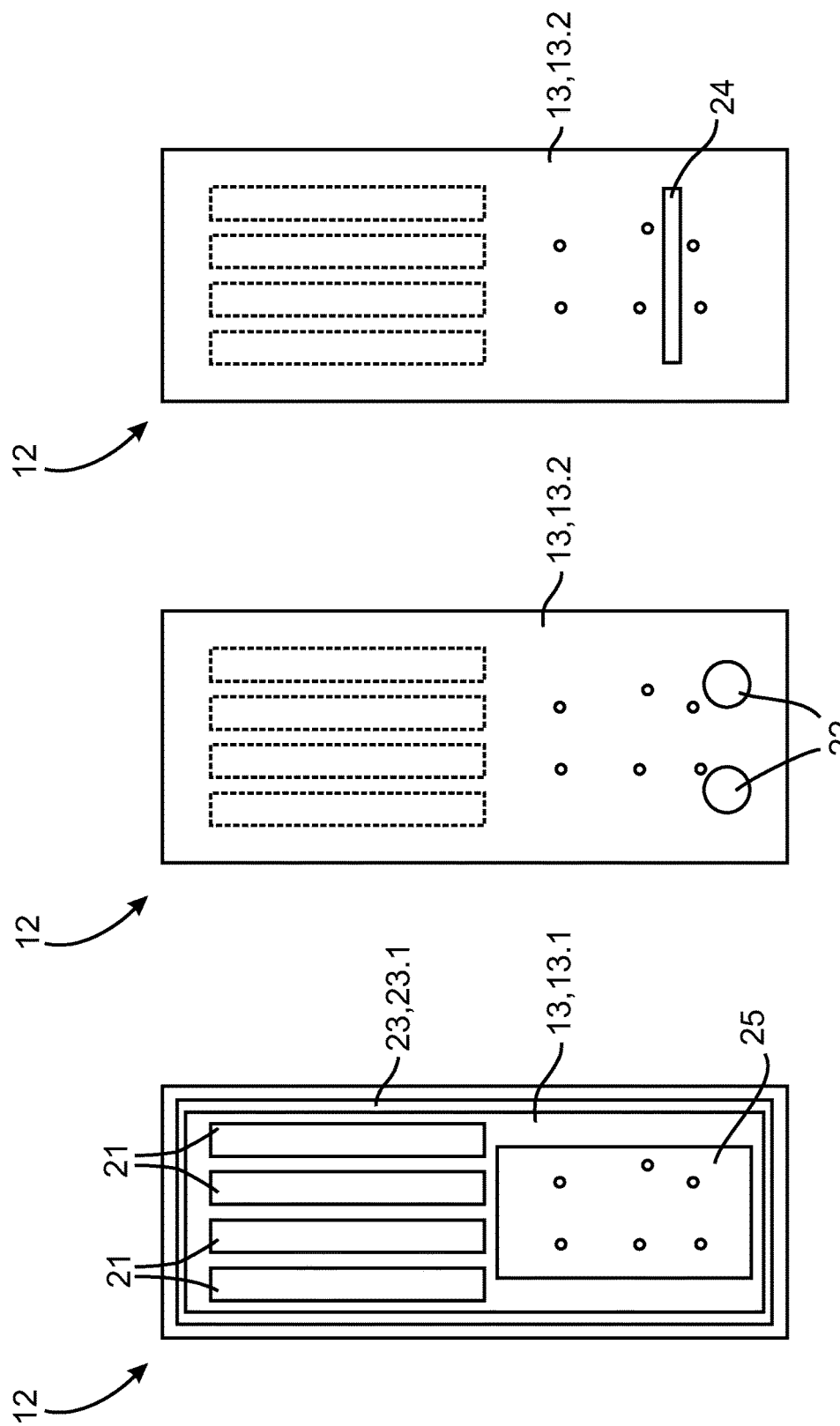

MODULAR ACTUATING DEVICE, VEHICLE, AND METHOD

The invention relates to an actuating device, a vehicle and a method.

Prior art actuating devices for vehicles are known in which a user can trigger a vehicle function by an actuation action. It is known to use proximity sensors to detect an approach of a user and, for example, to unlock a door lock of a vehicle door so that the user can conveniently open the vehicle door. Such proximity sensors are usually integrated in a door handle. Due to their geometry, door handles offer the advantage that they allow simple encapsulation of the sensor technology in order to protect the sensor technology from moisture and other environmental influences. However, if the sensor system is to be arranged on another vehicle part, such as a body component, for example, such encapsulation cannot be easily transferred to the body component due to the flat extension of the vehicle part.

It is an object of the present invention to at least partially eliminate the aforementioned disadvantages known from the prior art. In particular, it is an object of the present invention to enable a sealing of a sensor unit for arrangement on a flat vehicle part of a vehicle, preferably outside a door handle of the vehicle, with improved manufacturing possibilities and/or improved ease of use.

The foregoing problem is solved by an actuating device having the features as described herein, a vehicle having the features as described herein, and a method having the features as described herein. Further features and details of the invention result from the respective dependent claims, the description and the drawings. In this context, features and details described in connection with the actuating device according to the invention naturally also apply in connection with the vehicle according to the invention and/or the method according to the invention, and vice versa in each case, so that reference is or can always be made mutually with regard to the disclosure concerning the individual aspects of the invention.

According to a first aspect of the invention, an actuating device for triggering a function of a vehicle by a user is provided. The actuating device comprises an electronics unit having a sensor unit for detecting an actuation action of the user that serves to trigger the function of the vehicle. The electronics unit has an electronics outer side, on which the actuation action of the user is detectable by the sensor unit, and an electronics inner side, which is opposite to the electronics outer side. Further, the actuating device comprises a first sleeve section for protecting the electronics inner side and a second sleeve section for protecting the electronics outer side. The first and second sleeve sections form, in particular for protecting the electronics unit, a closed sleeve, in particular around the electronics unit, for modular arrangement on a cover element of the vehicle.

The cover element preferably forms part of a, preferably movable, vehicle part. The function of the vehicle part may comprise, for example, unlocking a door lock, opening a vehicle door and/or switching on a lighting and/or an electrical device. The vehicle part may comprise, for example, an exterior component or an interior component of the vehicle.

In particular, the electronics unit can have several conductor tracks and/or electronics components, preferably in the form of semiconductor elements, to process electrical signals. Furthermore, the electronics unit may have a power source for supplying power to the sensor unit and/or an electrical connection for connection to a vehicle power supply. For example, it is conceivable that the sleeve comprises a cable outlet through which cables can be guided from the electronics unit to an outside of the sleeve. This can ensure an electrical connection between the electronics unit and a vehicle electronics system and/or a vehicle power supply. Preferably, the electronics unit has a planar extension. In particular, a longitudinal side of the electronics unit can be oriented vertically and/or horizontally on the vehicle part. The electronics inner side and the electronics outer side can, for example, each comprise a side of a printed circuit board of the electronics unit on which electrical components are arranged. In particular, the electronics inner side is opposite the electronics outer side with respect to the electronics unit. The electronics inner side may further be oriented facing away from the cover element. In this regard, the sensor unit may preferably be oriented such that the actuating action on the electronics outer side is detectable, in particular when the user is located on the electronics outer side on the vehicle or in the vicinity of the vehicle. In particular, the actuation action can be detectable on a cover outer side of the cover element. This can be understood to mean, in particular, that the actuation action can be detected on a surface of the outer side of the cover element and/or that the actuation action can be detected at a distance from a surface of the outer side of the cover element. It is conceivable that the sensor unit is designed/configured, for example, for capacitive, inductive and/or optical detection of the actuation action and/or for detection of the actuation action by means of ultrasound. The sensor unit can preferably be designed/configured for motion detection, in particular for gesture detection, at a distance, in particular from 1 cm to 20 cm, preferably from 2 cm to 15 cm, particularly preferably from 5 cm to 10 cm, from the actuating device.

The first and/or second sleeve section can be fastened or attachable directly or indirectly to the cover element. Preferably, the sleeve can be arranged to the cover element in such a way that the second sleeve section faces the cover element and the first sleeve section faces away from the cover element. For example, the first sleeve section can be formed by a housing sleeve which is fixed to the second sleeve section with a sealing compound. However, it is also conceivable that the first sleeve section is applied to the electronics unit and the second sleeve section in at least partially liquid form. In particular, the sleeve may thus form a closed housing that is modularly attachable to the cover element. The second sleeve section can be flush with the first sleeve section or project beyond the first sleeve section. It is also conceivable for the first sleeve section to project beyond the second sleeve section.

Preferably, the sleeve, in particular the first and/or the second sleeve section, has at least one fastening interface for fastening the sleeve to the cover element. The fastening interface can be designed/configured for screwing or caulking the sleeve to the cover element. For example, the fastening interface may comprise a bore through which a screw body and/or a projection for caulking may be inserted. However, it is also conceivable that the casing can be riveted, bonded or otherwise fixed to the cover element through the fastening interface. Preferably, several fastening interfaces can be provided.

The electronics unit with the sensor unit is thus protected by the second sleeve section, particularly on the outside of the electronics. This means, for example, that a separate, complete housing is formed for the electronics unit, which can be variably attached to the vehicle. Furthermore, the actuating device can be adapted in a cost-effective manner for flat vehicle parts of any shape. This means that the actuating device can be supplied as a single assembly. The assembly can be mountable at different positions on the vehicle as required. In particular, this can enable improved standardization for the actuating device. Thus, a higher flexibility in the use of the actuating device can be achieved.

It is further conceivable in an actuating device according to the invention that the first sleeve section comprises a casting compound or a lid element, in particular wherein the first sleeve section is connected to the cover element by a material bond. The lid element may preferably be a rigid cover element. For example, the lid element may comprise a hard component and/or a soft component made of plastic. In particular, the casting compound may comprise an epoxy resin and/or an acrylate to protect the electronics unit from environmental influences, in particular from moisture. In particular, the casting compound may be transparent or opaque and/or light impermeable. The casting compound may implement a material bond between the first sleeve section and the second sleeve section. In particular, the electronics inner side and/or the electronics outer side can be completely covered with casting compound. Preferably, at least the sensor unit is completely covered with casting compound. Between the lid element and the second sleeve section, a seal can be implemented by a sealing means/element, in particular one that runs around the lid element. The sealing means/element may, for example, comprise a silicone or a sealing adhesive. Furthermore, the sealing means/element can simultaneously form a material-bonding of the lid element to the second sleeve section and/or to the cover element. The first sleeve section can be bonded, welded, in particular friction-welded and/or laser-welded, to the second sleeve section.

Preferably, in an actuating device according to the invention, it can be provided that the second sleeve section comprises a shell element, in particular in which the electronics unit is arranged, in particular in a form-fitting manner. The shell element may preferably be a rigid sleeve section. For example, the shell element may comprise a hard component and/or a soft component made of plastic. In particular, the shell element may be formed materially uniform or substantially materially uniform with the lid element. Furthermore, it is conceivable that the shell element is slipped over the electronics unit and/or the first sleeve section. For form-fitting of the electronics unit, the second sleeve section can have latching elements. Preferably, the first and/or second sleeve section and the electronics unit are configured in such a way that the electronics unit can be arranged in at most two orientations, preferably in only one orientation, between the first and second sleeve section. For this purpose, the electronics unit and the first and/or second sleeve section can have positioning aids, in particular in the form of asymmetrical recesses and/or projections. In this way, incorrect assembly can be intuitively prevented.

Preferably, in an actuating device according to the invention, it can be provided that the electronics unit is bonded or welded to the first and/or second sleeve section. For example, the electronics unit can be attached to the first and/or second sleeve section by laser welding or friction welding. In particular, the casting compound may be distributed in such a way that the electronics unit is materially bonded to the first and/or second cladding section by the casting compound. Additionally, or alternatively, it may be provided that the electronics unit is caulked to the first and/or second sleeve section. By fixing the electronics unit to the first and/or second sleeve section, movement within the sleeve can also be prevented during operation of the actuating device. Furthermore, further assembly steps can be simplified by fixing the electronics unit.

Preferably, in an actuating device according to the invention, it can be provided that the electronics unit has a printed circuit board, preferably in the form of a circuit board, with at least one, in particular capacitive or inductive, sensor element of the sensor unit for detecting the (preferably contactless) actuation action. In particular, the printed circuit board forms a base for the electronics unit. Preferably, the printed circuit board is a multilayer printed circuit board. The sensor element may in particular be a sensor electrode. For example, the sensor element may comprise an electrical coil or a sensor surface in the form of an electrically conductive surface. As a result, a capacitive or inductive change in an electromagnetic field can be detectable. Corresponding to the sensor element, a shield element, in particular in the form of a shield electrode, can be arranged on the inside of the electronics, through which an electric field of the sensor element can be alignable. Furthermore, it is conceivable that the sensor element is surrounded by a shield element on the outside of the electronics, through which an electric field of the sensor element can be aligned. Furthermore, it is conceivable that the electronics unit has several printed circuit boards on which various electronics components are distributed.

Preferably, in an actuating device according to the invention, it can be provided that the sensor unit comprises several, in particular similar, sensor elements for detecting the actuation action, whereby a direction of the actuation action can be identified. For example, the sensor elements may be manufactured by a printing and/or an etching process. The sensor elements may be inductive and/or capacitive. Additionally or alternatively, it is conceivable that the sensor elements are designed/configured for optical detection and/or for detection by means of ultrasound. The direction of the actuation action can be detected along an arrangement direction of the sensor elements, in particular on the outside of the electronics. Thus, a gesture can be provided as the actuation action. For example, if the function of the vehicle is an opening of a sliding door of the vehicle, a gesture along an opening direction of the sliding door may be provided as the actuation action. Preferably, the sensor elements are arranged such that a horizontal gesture in front of the vehicle part leads to the triggering of the function of the vehicle by the sensor unit.

Preferably, in an actuating device according to the invention, it can be provided that the sensor elements are arranged in a regular pattern, preferably matrix-like and/or strip-like, on the printed circuit board. Due to the regular pattern, a gesture recognition for recognizing the actuation action may be simplified. A matrix-like arrangement can be understood as a two-dimensional arrangement of the sensor elements. For example, an arrangement of two by two sensor elements in one plane, in particular on the outside of the electronics, may form the smallest matrix-like arrangement. In the strip-like arrangement, the sensor elements preferably have an elongated extension. In particular, in the strip-like arrangement, the sensor elements are arranged next to each other in a strip pattern. Thereby, a distance between the sensor elements can be constant. Preferably, the sensor elements in the strip-like arrangement on the printed circuit board form a pattern that extends in only one direction. Furthermore, it is conceivable that the sensor elements are arranged in an irregular pattern on the printed circuit board. By arranging the sensor elements in a pattern, an arbitrarily complex actuation action can be detectable in one plane. Furthermore, by arranging the sensor elements on a single printed circuit board, a construction unit can be enabled that is easy to handle during manufacturing and provides short signal paths for detecting the actuation action. It can also be simplified to manufacture the sensor elements using a printing or etching process.

Furthermore, in an actuating device according to the invention, it is conceivable that the electronics unit has an information unit by means of which the detection of the actuation action can be confirmed to the user, preferably on the outside of the panel, and/or a start of the actuation action can be signalled, in particular with the information unit being arranged on the printed circuit board. By means of the indication unit, an indication in the form of a signal can be output to the user that the user can start the actuation action and/or that the actuation action has been detected by the sensor unit. Thus, the hint unit can be used as, in particular, a contactless user interface. The indication in the form of the signal can be, for example, acoustic or optical. Likewise, it is conceivable that the indication in the form of the signal is made as a radio signal, for example to a smartphone or an electronics key of the user. Preferably, the indication unit is a unidirectional transmission unit. In particular, an input can be provided by the user via the sensor unit. Thus, the hint unit and the sensor unit can form a dialogue unit for bidirectional communication with the user. By arranging the indication unit on the printed circuit board on which the sensor element is also arranged, manufacturing of the actuating device can be simplified and signal paths of the electronics unit can be simple and short.

Preferably, in an actuating device according to the invention, it can be provided that the indication unit is an optical indication unit and the second sleeve section comprises at least one light-transmitting window region through which an optical signal can be transmitted to the user by the indication unit. Preferably, the window region comprises one or more transparent portions. For example, the window region may comprise at least one recess in a sleeve material of the second sleeve section that is closed by a light-transmitting material. Thus, a seal of the sleeve may be maintained and the indication unit may be disposed within the sleeve. The first and/or second sleeve section may be a two-component plastic injection molding. Preferably, a transparent material may be injection molded in the window region to an opaque and/or light-transmitting sleeve material of the second sleeve section. Also, second sleeve section may be completely formed by the light-transmitting window region, wherein a coating and/or painting and/or film may be present to make partial areas light impermeable.

Furthermore, in an actuating device according to the invention, it can be advantageously provided that the information unit has a plurality of light emitters for emitting an optical signal to the user, the light emitters being separated from one another at least in certain areas by light impermeable separating sections. By means of several light emitters, more complex information can be transmitted to the user as an indication. For example, the indication transmittable by the indication unit may comprise a direction or the like. In particular, the light emitters can be dynamically controllable so that a dynamic display progression can be realized. The light emitters may be illuminants, in particular in the form of LEDs. Furthermore, it is conceivable that the information unit comprises an LED or OLED display and the light emitters are formed by individual display elements. By means of a display, display symbols of different complexity may be displayable to a user in order to be able to convey information to a user about an expected actuation action, a confirmed actuation action and/or the like. In particular, the window region may include a plurality of translucent sections separated from each other by the separating sections, particularly in the form of light transmitting and/or light impermeable material sections. The separating sections may be integrally formed with the second sleeve section or separately formed from the second sleeve section. For example, an intermediate element may be provided, in particular in the form of an insert, comprising one of the separation sections or a plurality of separation sections. The intermediate element may be formed, for example, of sponge rubber or another flexible material. Preferably, the intermediate element has closed pores. As a result, the intermediate element may be formed to be non-water-attracting. Further, the intermediate element may be formed as an adhesive tape or may be attached to the cover element and/or the sleeve by an adhesive tape. In particular, the separation portions may be formed by the second sleeve section and/or the intermediate element or may be formable by the cover element. The separating portions may improve distinguishability of the light source behind from a cover element. Preferably, the separating sections may extend between the light emitters in a rib-like manner. The separating sections may direct light from the light emitters in a direction so that a user can associate the light with one of the light emitters, which may result in a clearer path when the light emitters are dynamically activated. Preferably, an encapsulated space is formed around each or group of the light emitters by the separating sections. For this purpose, the separating sections can be formed circumferentially around the light emitters and/or make sealing contact with the printed circuit board. In this way, for example, the outside of the electronics can be covered with casting compound by filling a gap between the electronics unit and the cover element without covering the light emitters with, in particular, opaque and/or light impermeable casting compound.

Preferably, in an actuating device according to the invention, it can be provided that the electronics outside of the electronics unit is covered with casting compound, in particular wherein the electronics unit and/or the second sleeve section has at least one receiving means/element for a casting nozzle for casting compound, so that the casting compound can be conveyed from the electronics inside to the electronics outside while the electronics unit is arranged on the second sleeve section. By casting the electronics exterior with the casting compound, a space between the electronics unit and the second sleeve section can be filled with casting compound. This prevents moisture from collecting in the intermediate space and thereby negatively affecting a measurement of the sensor unit. The receiving means/element allows casting compound to be reliably applied to the outside of the electronics unit after the electronics unit has been arranged on the cover element. A casting nozzle can be understood as a tool or part of a tool for distributing casting compound. In particular, a plurality of receiving means/element for the casting nozzle can be provided circumferentially around a printed circuit board of the electronics unit on a frame of the electronics unit and/or of the second sleeve section. This can enable reliable and homogeneous distribution of the casting compound in the interspace. Additionally or alternatively, it is conceivable that an elastic intermediate element is arranged in an intermediate space between the electronics unit and the second sleeve section. Preferably, the intermediate element comprises a material with closed pores. Furthermore, the intermediate element can be elastically prestressed against the second sleeve section by the electronics unit and/or the first sleeve section. In this way, the intermediate element can also enable filling of the intermediate space, which prevents moisture from penetrating.

Furthermore, in an actuating device according to the invention, it is conceivable that the sensor unit, the electronics unit and/or the casing is designed/configured at least partially or completely symmetrically, in particular with respect to a central plane of the actuating device, as a result of which the actuating device can be optionally mounted on two opposite sides of the vehicle. For example, for use on different sides of the vehicle, only a reprogramming of a control unit of the electronics unit can be carried out. Furthermore, it is conceivable that a switch can be switched over, by means of which an arrangement on the left or right side in the direction of travel is determined. Depending on the side of the vehicle, for example, the direction of the actuation action for triggering the function of the vehicle and/or a display sequence of the information unit can be defined. In the case of sliding doors on both sides, for example, both doors can open towards the rear of the vehicle, so that a mirrored actuation action is expected in each case along the opening direction for automatic opening of the respective sliding door.

Furthermore, in an actuating device according to the invention, it is conceivable that the electronics unit has a touch sensor for detecting a pressure on the cover element, whereby a further function of the vehicle can be triggered, in particular wherein the touch sensor comprises an LDC sensor (inductive-action sensor). The touch sensor may enable a further actuation action of the user. The further function of the vehicle may be, for example, a locking and/or unlocking of a lock. Additionally or alternatively, the touch sensor may enable an emergency stop to be effected during an automatic opening and/or closing of a door. For example, an electrically conductive target element can be provided on the second sleeve section and/or on the cover element, the change in distance of which can be registered by the touch sensor when the user presses on the vehicle part and/or the cover element. Preferably, a plurality of LDC sensors may be provided, in particular to enable detection of the further actuation action to be verified and/or over a wider actuation range on the vehicle part and/or the cover element. If, for example, provision is made for the function that can be triggered by the sensor unit to be enabled only after the further function has been activated, the probability of false triggering can be significantly reduced.

Preferably, in an actuating device according to the invention, it can be provided that the electronics unit has an identification means/element for identifying the user, in particular wherein the identification means/element has a radio element for contactless data exchange with an ID transmitter. The ID transmitter may be understood to mean, for example, a smartphone and/or an electronics key of the user. In particular, the identification means/element may comprise an NFC interface (Near Field Communication interface), a BLE interface (Bluetooth Low Energy interface) and/or UWB interface (Ultra-wideband interface). This may enable authentication of the user by the identification means/element. In particular, the identification means/element may be capable of being brought into communication with a vehicle control unit for identification of the user. In particular, the identity check can be executable by the vehicle control unit on the basis of the data exchange of the identification means/element with the ID transmitter.

It is further conceivable in an actuating device according to the invention that the electronics unit has a proximity sensor for detecting an approach of a user, in particular wherein the proximity sensor is designed/configured for capacitive detection of the approach. Thus, the proximity sensor can in particular provide a further capacitive sensor in addition to the sensor unit. By means of the proximity sensor, for example, the sensor unit, the touch sensor and/or the identification means/element can be awakened when the approach of the user is detected. This may allow energy to be conserved during operation of the actuating device. Further, the proximity sensor may be capable of activating the notification unit when the proximity is detected. For example, an activation state of the actuating device can thereby be signalled to a user.

Furthermore, in an actuating device according to the invention, it can advantageously be provided that the printed circuit board has several conductor layers, with the sensor unit being arranged on a first conductor layer and the touch sensor and/or the identifier being arranged on a further conductor layer. In this case, the conductor layers can be electrically insulated from one another. In particular, a sensor plane can be formed by each of the conductor layers. In this way, a compact design/configuration of the printed circuit board and/or the electronics unit can be achieved.

Furthermore, in an actuating device according to the invention, it can advantageously be provided that the electronics unit has a control unit for evaluating sensor signals from the sensor unit and for actuating the indicator unit as a function of the sensor signals. For example, the sensor signals of the sensor unit can be digitized and forwarded by the control unit directly in the electronics unit. Furthermore, it is conceivable that a direction of the actuation action can be detected by the control unit on the basis of the evaluation of the sensor signals. The evaluation of the sensor signals in the electronics unit can enable short signal paths. In addition, the information unit can be controlled as a function of the sensor signals, whereby the user can be provided with feedback on the detection of the direction of the actuation action.

According to another aspect of the invention, a vehicle is provided. The vehicle comprises a vehicle part having a cover element. Further, the vehicle comprises an actuating device, in particular an actuating device according to the invention, for triggering a function of the vehicle by a user. The actuating device comprises an electronics unit having a sensor unit for detecting an actuation action of the user for triggering the function of the vehicle, an electronics outer side on which the actuation action of the user can be detected by the sensor unit, and an electronics inner side which is opposite the electronics outer side. Further, the actuating device comprises a first sleeve section for protecting the electronics inner side of the electronics unit and a second sleeve section for protecting the electronics outer side of the electronics unit. The first and second sleeve sections form, in particular around the electronics unit, a closed sleeve that is arranged modularly on the cover element.

Thus, a vehicle according to the invention brings the same advantages as have been described in detail with reference to an actuating device according to the invention. Preferably, the vehicle is a motor vehicle. Preferably, the vehicle part further comprises a B-pillar of the vehicle and/or an interior part of the vehicle. The function triggerable by the actuating device may comprise an automatic movement of the vehicle part.

The flat design/configuration of the cover element can be understood in particular to mean that the cover element has a flat, in particular shell-like, extension. For example, the cover element can have a thin-walled design/configuration. The cover element may in particular be a panel for a body component of the vehicle. For example, an outer surface of the vehicle component may be formable by the cover element. The outer surface may be an interior surface or an exterior surface of the vehicle. Preferably, the cover element may form a visible surface of the vehicle part. For example, the cover element may be arrangeable behind a pane of glass, in particular with respect to an exterior surface of the vehicle. In this case, the actuating device is preferably arranged on a door of the vehicle, in particular a side door and/or sliding door. As a result, optical and/or electromagnetic signals can be transmitted to a user located in front of the vehicle part and/or can be received by the user through the sensor unit. Preferably, the cover element may be integrable into a body surface and/or an optic of a body surface of the vehicle, in particular to enable the opening of a side door of the vehicle as a function triggerable by the actuation action. It is conceivable that the cover element can be integrated into a B-pillar of the vehicle. Consequently, in this case the actuating device is optionally arranged on the B-pillar. In particular, the cover element has a plastic or is made of a plastic. Due to the sensor unit, the cover element can be designed/configured without a handle and/or switch. In particular, the cover element has a cover inner side and a cover outer side. In this case, the cover inner side is opposite the cover outer side with respect to the cover element in particular. For example, the vehicle part can have a cover inner side in which electrical components can be arranged. In this case, the inner side of the cover can be oriented in particular towards the interior of the cover. The cover can in particular be caulked or screwed to the cover element. This can provide an advantageous fastening option, in particular under pretension.

Thus, the electronics unit with the sensor unit is protected by the cover element, allowing the actuating device to be mounted on the vehicle part in a cost-effective manner. Furthermore, design/configuration freedom of the cover element can be increased if the electronics unit is arranged modularly on the cover element when the vehicle part is mounted. In this way, greater overall flexibility can also be achieved in the manufacture of the actuating device.

Preferably, in a vehicle according to the invention, provision can be made for an elastic intermediate element to be arranged in an intermediate region between the cover element and the actuating device, preferably between the cover element and the sleeve of the actuating device, in particular with the actuating device being prestressed against the intermediate element or with the actuating device being fastened by the intermediate element to the cover element, preferably with a material bond. In particular, the intermediate element is thereby arranged on the inner side of the cover element and/or on the outer side of the electronics unit on the cover. By means of the intermediate element, it may advantageously be possible to reduce noise generation, in particular when the actuating device is biased against the intermediate element. The intermediate element may be compressed when the actuating device is biased against the intermediate element. The intermediate element may preferably comprise a closed-pored material, in particular which is thereby formed to be non-water-attracting. This may prevent moisture from accumulating in the intermediate element. Furthermore, the intermediate element preferably comprises a window region through which an optical signal of the indication unit can be transmitted. Preferably, the intermediate element further comprises separating sections for optically separating the light emitters of the indication unit and/or for guiding and/or channelling emitted light along a predetermined light path. Furthermore, it may be provided that the intermediate section is sealed by a circumferential sealing means/element. For biasing the intermediate element, the actuating device may be clipped or screwed to the cover element, for example. Preferably, the intermediate element is arranged between the actuating device and the cover element in such a way that a sensor area of the sensor unit extends, in particular completely, through the intermediate element. For example, the intermediate element can be arranged between the sensor element of the sensor unit or the sensor elements of the sensor unit and the cover element.

Furthermore, it is conceivable that the intermediate element comprises an adhesive tape, in particular a double-sided adhesive tape, by means of which the actuating device is attached to the cover element. This may improve a performance of the sensor unit. In particular, the intermediate element may be arranged at the second sleeve section, i.e. in particular directly between the second sleeve section and the cover element. In this regard, the intermediate element may extend at least partially or completely over an outer surface of the second cladding section. For example, the cladding may be cuboidal, i.e. in particular having four side surfaces and two main surfaces. Preferably, the first and second sleeve sections are joined at the side surfaces and/or sealed by the sealing means/element. In this case, the main surfaces can be oriented parallel or at least substantially parallel to the inside of the electronics, to the outside of the electronics and/or to the inside of the cladding. The intermediate element can be arranged on one of the main surfaces, in particular such that the intermediate element is arranged directly between the main surface and the cover element.

It is further conceivable, in a vehicle and/or actuating device according to the invention, that an intermediate element for arrangement in an intermediate area between the cover element and the sleeve is integrally formed with the second sleeve section. For example, the second sleeve section may be manufactured in a multi-component plastic injection molding process. In particular, the intermediate element may be formed as a soft component, in particular a closed-pore soft component. As a result, the sleeve can be prestressed against the cover element, in particular whereby noise formation can be prevented or reduced.

According to a further aspect of the invention, there is provided a method for mounting an actuating device, in particular an actuating device according to the invention, for triggering a function of a vehicle, in particular a vehicle according to the invention, by a user on a vehicle part of the vehicle. The method comprises the following steps/stages:

Providing an electronics unit with a sensor unit for detecting an actuation action of the user for triggering the function of the vehicle, the electronics unit having an electronics outer side on which the actuation action of the user can be detected by the sensor unit, and an electronics inner side which is opposite the electronics outer side, Arranging the electronics unit between a first sleeve section for protecting the inside of the electronics and a second sleeve section for protecting the outside of the electronics, Closing the first and second sleeve sections to form a closed sleeve of the actuating device, particularly to protect the electronics unit, Fastening the cover to a trim element of the vehicle part, in particular modularly.

Thus, a method according to the invention brings the same advantages as have already been described in detail with reference to an actuating device according to the invention and/or a vehicle according to the invention. The arranging and the sealing can also be carried out simultaneously if, for example, the first sleeve section comprises a casting compound and is poured with the second sleeve section and the electronics unit. Preferably, the planar cover element is a casting, in particular a multi-component plastic injection molding. Furthermore, the cover element may comprise a non-conductive material, in particular a non-conductive plastic, whereby the cover element is permeable to an electric field of the sensor unit. When providing the electronics unit, a printed circuit board may be equipped with electronics components, printed. Additionally or alternatively, electronics components may be etched when providing the electronics unit. When arranging the electronics unit between the first and second sleeve sections, a material bond of the first sleeve section to the second sleeve section and/or to the electronics unit can be obtained. In particular, when arranging the electronics unit between the first and second sleeve sections, it can be provided that the electronics unit is first arranged in the first or second sleeve section before the respective other sleeve section is added.

The sleeve can be fastened to the cover element of the vehicle part in particular by arranging an intermediate element between the sleeve and the cover element. In this case, the intermediate element can be used, for example, to create a material bond with the cover and the cover element in each case. Preferably, the intermediate element can be designed/configured as a double-sided adhesive tape.

Thus, the electronics unit with the sensor unit is protected by the cover independently of the cover element, allowing the actuation device to be mounted on the vehicle part in a cost-effective manner.

Furthermore, in a method according to the invention, it can advantageously be provided that the sleeve is pre-stressed, in particular mechanically, against an inner side of the sleeve of the sleeve element when the sleeve is fastened to the sleeve element, in particular wherein an intermediate region between the sleeve element and the sleeve is sealed. In this case, an elastic intermediate element can be arranged in the intermediate region in order to completely fill the intermediate region at least in the region of the sensor elements of the sensor unit. For example, the casing can be caulked or screwed to the cover element under pretension of the.

Figure 2:
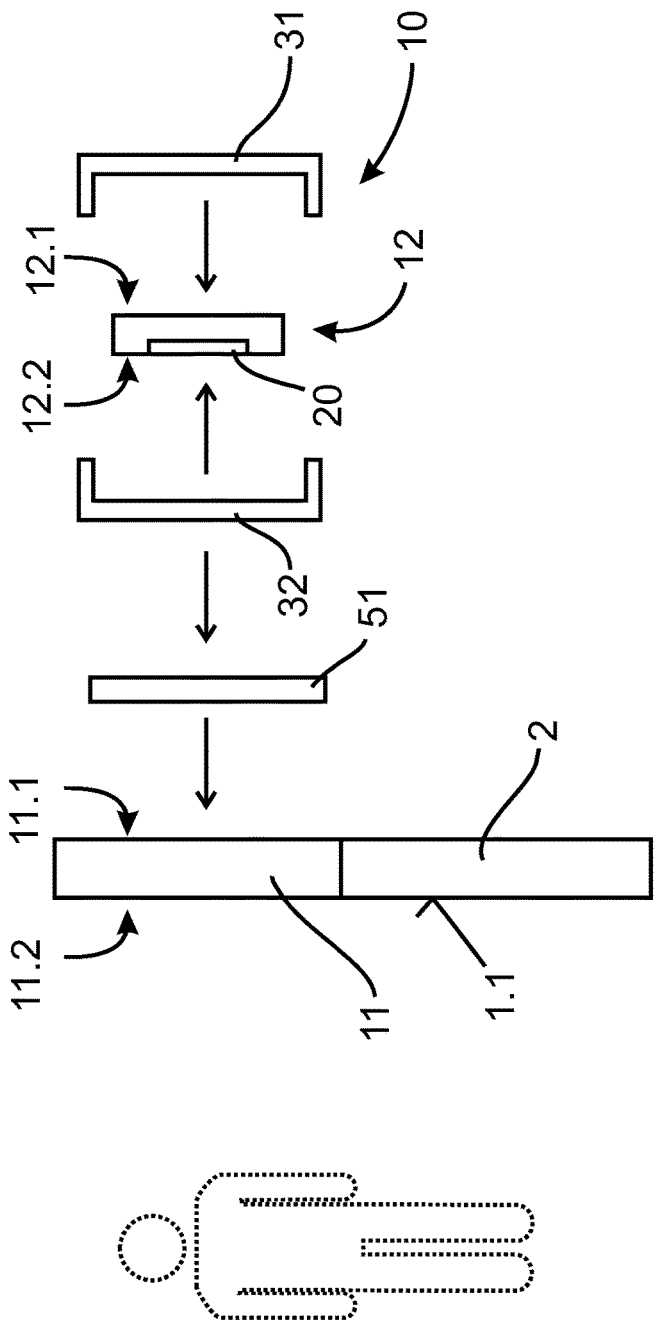
Figure 6:
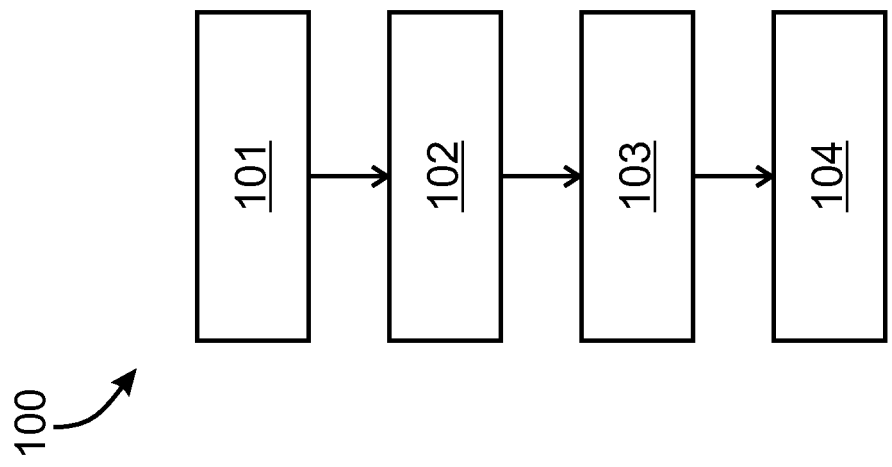
Figure 5:
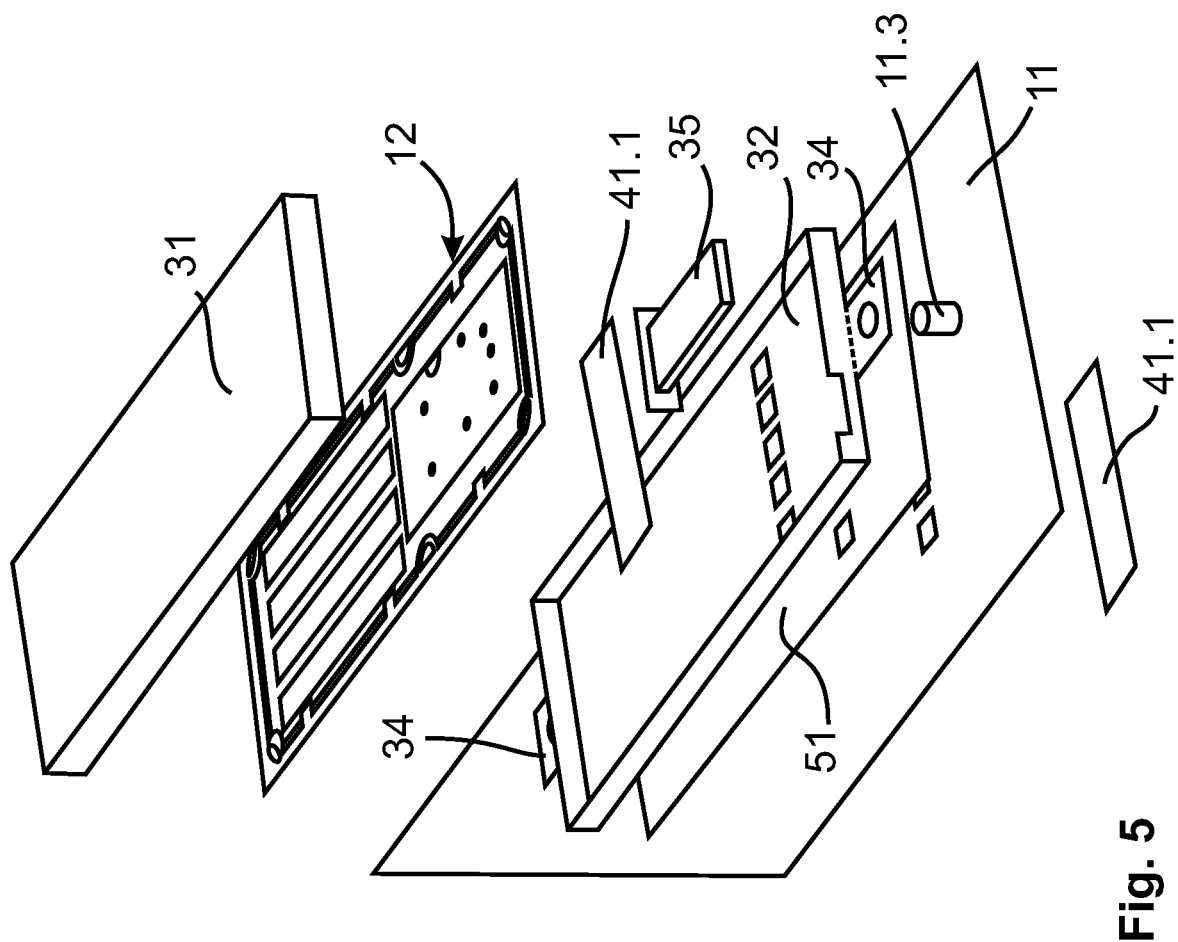
Figure 8:
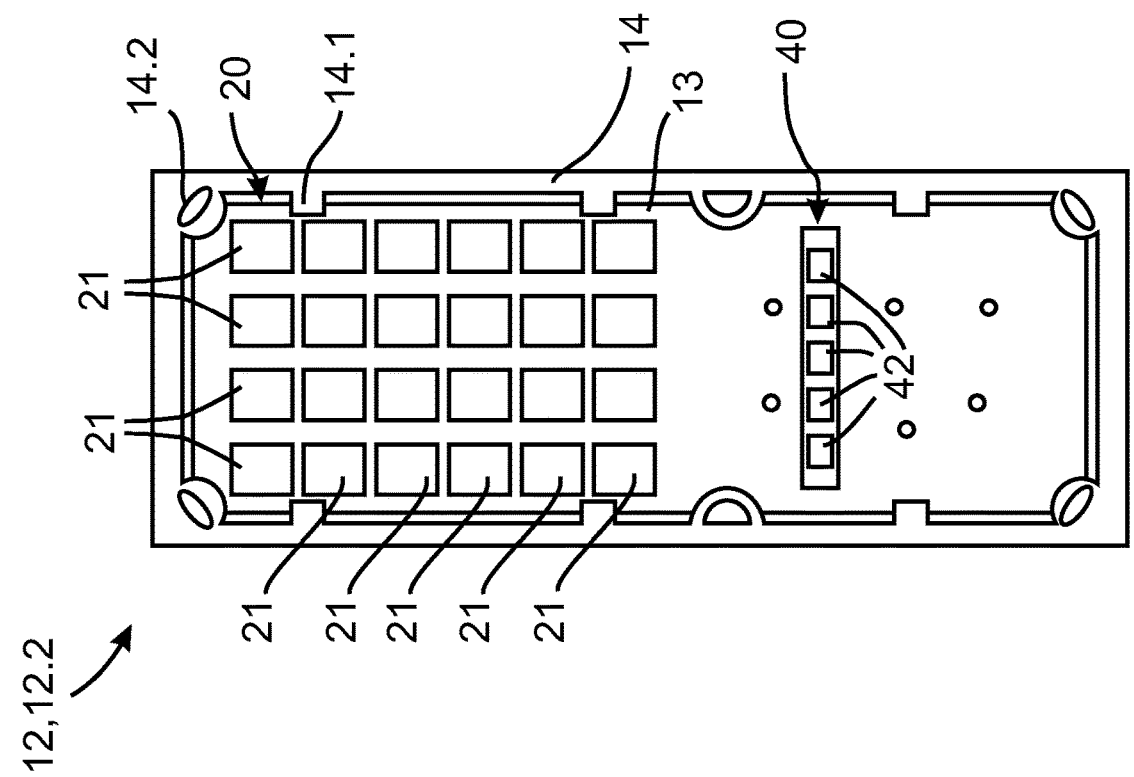
Figure 7:
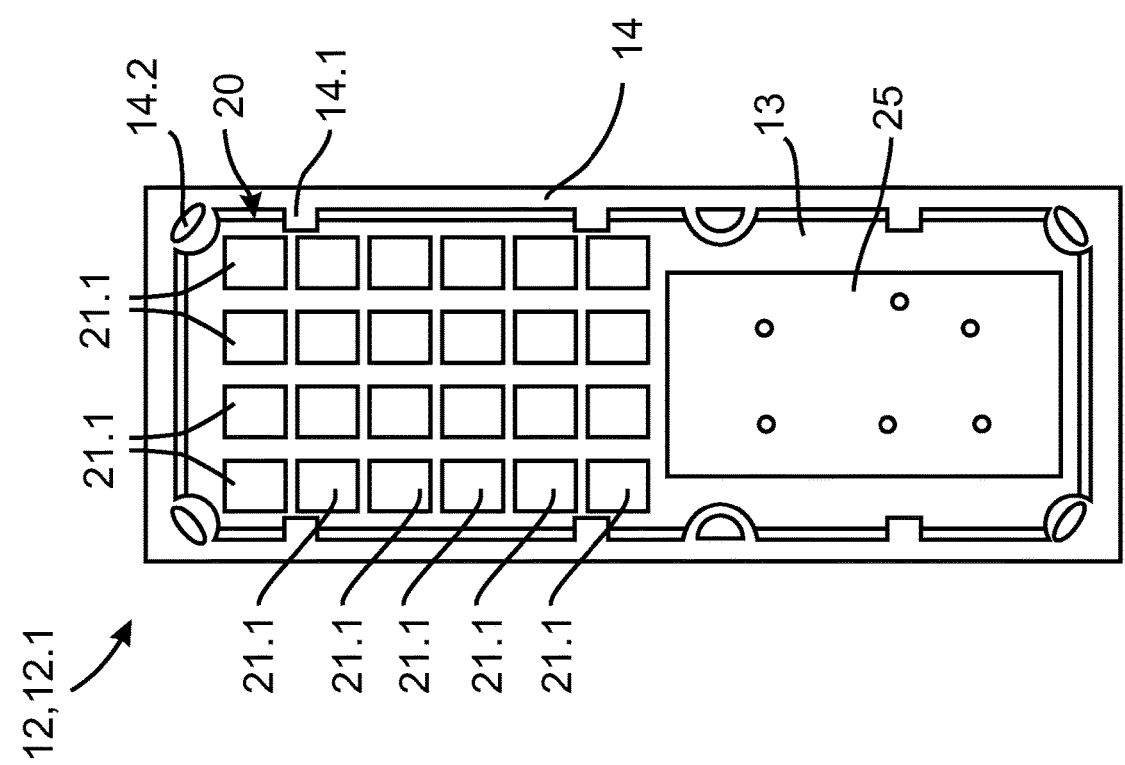
Figure 10:
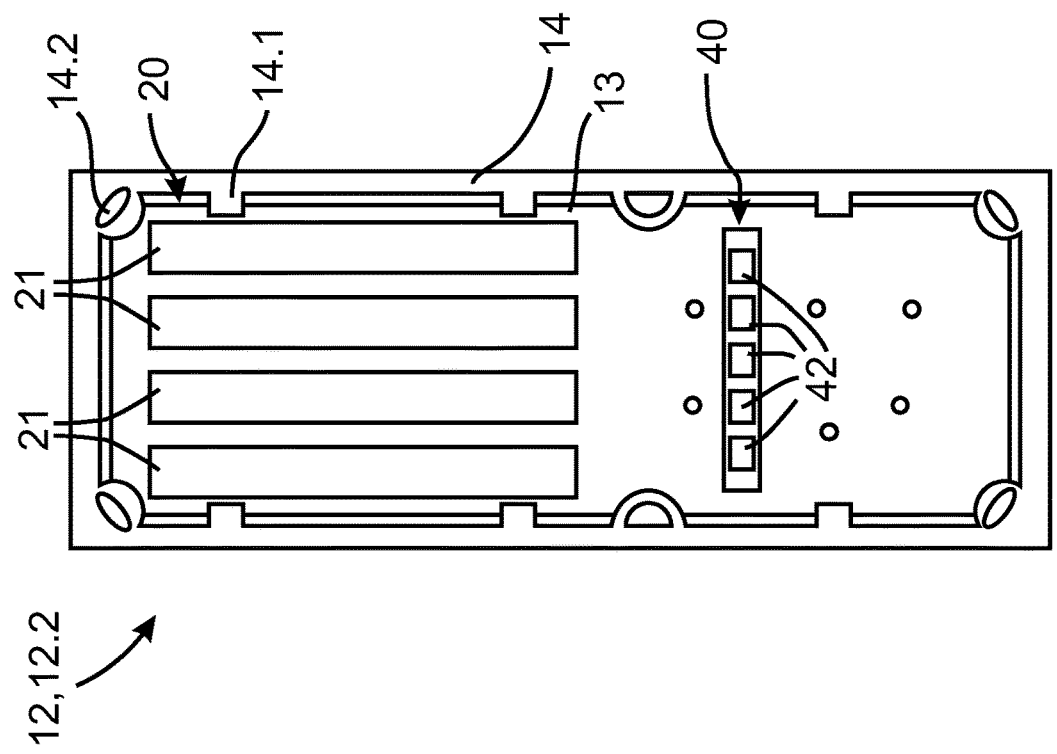
Figure 9:
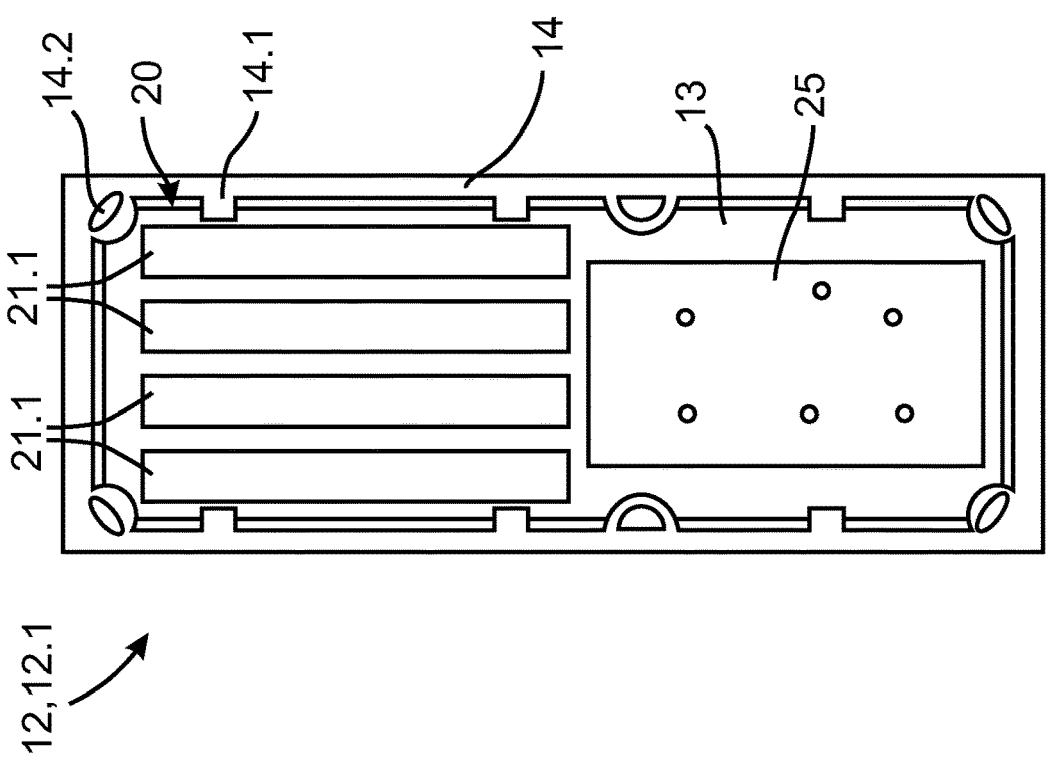

Further advantages, features and details of the invention will be apparent from the following description, in which embodiments of the invention are described in detail with reference to the drawings. In this connection, the features mentioned in the claims and in the description may each be essential to the invention individually or in any combination. It schematically shows:

FIG. 1 A vehicle according to the invention with an actuating device according to the invention in a first embodiment example FIG. 2 a schematic exploded view of the actuation device, FIGS. 3-4 different examples of the actuating device in sectional view, FIG. 5 another schematic exploded view of an actuating device, FIG. 6 A schematic representation of the process steps/stages according to the invention, FIGS. 7-8 an electronics unit of the actuating device in a further embodiment, FIGS. 9-10 an electronics unit of the actuation device in a further embodiment, FIGS. 11-13 Different conductor layers of a printed circuit board of the electronics unit.

In the following description of some embodiments of the invention, the identical reference signs are used for the same technical features even in different embodiments.

FIG. 1 shows a vehicle 1 according to the invention in a first embodiment with a vehicle part 2, which is designed/configured in particular as a vehicle door in the form of a sliding door. Thereby, the vehicle 1 further comprises an actuating device 10 for triggering a function of the vehicle 1. The function can, for example, be an automatic opening and/or closing of the sliding door. In this case, the function is performed in particular as a function of an actuation action 200 of a user. For example, an actuation action 200 in the form of a gesture along an opening direction of the vehicle part 2 can initiate the opening of the vehicle part 2 or an actuation action 200 in the form of a gesture in the opposite direction to the opening direction can initiate the closing of the vehicle part 2. The actuating device 10 can be—as shown by way of example—be arranged on a B-pillar 2.1 and/or on a vehicle part 2, in particular in the form of a door or sliding door, of the vehicle 1.

As shown in FIG. 2, the actuating device 10 is arranged on a cover element 11 of the vehicle part 2. The planar configuration of the cover element 11 may extend, for example, along a portion of the body of the vehicle 1 or behind a glass pane of the vehicle part 2. The cover element 11 comprises a cover outer side 11.2 and a cover inner side 11.1. The cover outer side 11.2 preferably forms a surface of the vehicle part 2 visible from outside the vehicle 1 and/or a part of a body surface 1.1. For example, the cover element 11 can be part of a covering in the area of a B-pillar 2.1 of the vehicle 1.

The actuating device 10 is arranged on the cover element 11, in particular directly or indirectly with an intermediate element 51. The actuating device 10 comprises an electronics unit 12, which has an electronics outer side 12.2 and an electronics inner side 12.1. The electronics outer side 12.2 is oriented towards the cover inner side 11.1 of the cover element 11. The electronics inner side 12.1 is opposite the electronics outer side 12.2. In particular, the electronics inner side 12.1 is oriented towards a vehicle interior of the vehicle 1 and/or a cover inner side of the vehicle part 2. However, it is also conceivable that the cover element 11 is part of a cover inner side of the vehicle 1. In this case, the electronics inner side 12.1 can be oriented towards an outside of the vehicle 1, for example.

Furthermore, the electronics unit 12 has a sensor unit 20 for detecting the actuation action 200 of the user. The sensor unit 20 is preferably arranged on the electronics outer side 12.2 of the electronics unit 12. Due to the arrangement of the electronics unit 12 on the cover inner side 11.1 of the cover element 11, the actuating device 10 can be at least partially concealed by the cover element 11. To protect the electronics unit 12, the actuating device 10 further comprises a first and a second sleeve section 31, 32 which form a closed sleeve 30 around the electronics unit 12. The first sleeve section 31 is thereby preferably arranged on the electronics inner side 12.1 and the second sleeve section 32 is arranged on the electronics outer side 12.2 of the electronics unit 12. Possible designs/configurations of the sleeve 30 are shown by way of example in FIGS. 3 and 4.

FIG. 3 shows a sleeve 30 in which the first sleeve section 31 is formed by a casting compound 31.1. The electronics unit 12 has a printed circuit board 13 on which the sensor unit 20 is arranged. The printed circuit board 13 of the electronics unit 12 is preferably enclosed in a frame 14, by means of which the electronics unit 12 can be handled more easily during assembly and/or can be form-fittingly fastened to the sleeve 30. The frame 14 may also form part of the sleeve 30. The casting compound 31.1 is materially bonded to the second sleeve section 32 and preferably completely covers the electronics inner side 12.1. Furthermore, in particular also the electronics outer side 12.2 may be at least partially or completely covered with the casting compound 31.1, so that at least the sensor unit 20 is covered by the casting compound 31.1. The second sleeve section 32 may comprise a shell element 32.1 into which the electronics unit 12 is inserted. For this purpose, the electronics unit 12 can be arranged in a form-fitting manner in the second sleeve section 32 directly or, for example, indirectly via the frame 14. Preferably, the sensor unit 20, the electronics unit 12 and/or the sleeve 30 is formed at least partially symmetrically with respect to an Intermediate level 10.1, whereby the actuating device 10 can be mounted on two opposite vehicle sides as desired.

Furthermore, the electronics unit 12 has an Information unit 40 by means of which the detection of the actuation action 200 can be confirmed to the user, in particular on the outer side of the cladding 11.2, and/or a start of the actuation action 200 can be signalled. The Information unit 40 comprises a plurality of light emitters 42 for emitting a visual signal to the user. The light emitters 42 may in particular be light emitter in the form of LEDs. The light emitters 42 are arranged in a row with respect to each other and separated by separating sections 43. By arranging the light emitters 42 in a row, for example, a direction of the actuation action 200 detected by the sensor unit 20 can be indicated to a user by activating the light emitters 42 along the row in succession. The separation sections 43 may be formed at least in sections by an intermediate element 51 disposed in an intermediate range 50 between the cover element 11 and the sleeve 30, by the second sleeve section 32 and/or by the cover element 11. In particular, the separation section 43 are opaque and/or light impermeable so that light emitted by the light emitters 42 can be guided separately to the cover outer side 11.2 for each light emitter 42. Preferably, the intermediate element 51 may further be resiliently configured and biased against the sleeve 30. Additionally or alternatively, it is conceivable that the sleeve 30 is fastened to the cover element 11 by the intermediate element 51, in particular in a material-bonding manner. For example, the intermediate element 51 may comprise a double-sided adhesive tape. In particular, when the separation section 43 and/or the intermediate element 51 are at least partially formed by the second sleeve section 32, each of the light emitters 42 may be encapsulated by the second sleeve section 32, in particular circumferentially, so that when the electronics unit 12 is casted with the casting compound 31.1, the light emitters 42 remain free of casting compound 31.1. Furthermore, the cover element 11 and/or the second sleeve section 32 has a light transmitting window region 41 through which an optical signal of the information unit 40 can be transmitted to the user. For example, the window region 41 may comprise a transparent window material 41.1, in particular a transparent plastic. The transparent window material 41.1 can be injection-molded onto an opaque and/or light impermeable base material of the cover element 11 and/or of the second sleeve section 32, for example as a plastic injection-molded component, during a production of the cover element 11 and/or of the second sleeve section 32.

Additionally or alternatively, the light emitters 42 can also be parts of a display or the like. Furthermore, it is additionally or alternatively conceivable that an acoustic indication or an indication in the form of radio signals can be output to the user by the information unit 40. It is further conceivable that the separating sections 43 are formed by the cover element 11. As shown in FIG. 4, the separating sections 43 may be formed integrally with the cover element 11. In this case, the separating sections 43 preferably extend in a rib-like manner to the printed circuit board 13.

FIG. 4 further shows a sleeve 30, in which the first sleeve section 31 is formed by a, in particular rigid, lid element 31.2. The lid element 31.2 can, for example, comprise a hard plastic and be placed on the second sleeve section 32 with the electronics unit 12 during assembly of the actuating device 10. In this case, a seal between the lid element 31.2 and the second sleeve section 32 can advantageously be implemented by a sealing means/element 33, in particular running around the lid element 31.2. The sealing means/element 33 may, for example, comprise a silicone. It is conceivable that the sealing means/element 33 simultaneously forms a material-bonding fastening of the lid element 31.2 to the cover element 11 and/or intermediate element 51.

FIG. 5 shows a further exploded view of the actuating device 10, in which the sleeve 30 has a mechanical fastening interface 34 for fastening the actuating device 10 to a counter-mounting interface 11.3 of the cover element 11. Preferably, the sleeve 30 may be screwed or caulked to the cover element 11. Furthermore, an electrical connection 35 may be provided through which the electronics unit 12 is connectable or connected to a vehicle electronics system and/or vehicle power supply. For this purpose, the electrical connection 35 may protrude from the sleeve 30. In particular, the electrical connection 35 can be casted with the sealing means/element 33 and/or the casting compound 31.1.

FIG. 6 shows a method 100 for manufacturing the actuating device 10 in schematic representation of the method steps/stages. In this process, provision 101 of the electronics unit 12 is provided. Furthermore, the cover element 11 can be provided, for example by producing the cover element 11 in a plastic injection molding process and/or taking it from a stock. During the providing 101 of the electronics unit 12, the sensor unit 20 and/or further electrical components may be arranged on the printed circuit board 13 of the electronics unit 12, in particular by a printing and/or etching process. Subsequently, an arranging 102 of the electronics unit 12 between the first and second sleeve sections 31, 32 and a closing 103 of the first and second sleeve sections 31, 32 to form the closed sleeve 30 is carried out. The arranging 102 and the closing 103 can also be carried out simultaneously if, for example, the first sleeve section 31 comprises a casting compound 31.1 and is casting with the second sleeve section 32 and the electronics unit 12. Furthermore, a fastening 104 of the sleeve 30 is performed, in particular by the at least one fastening interface 34 to the cover element 11, preferably such that the electronics outer side 12.2 of the electronics unit 12 is oriented towards the cover inner side 11.1 of the cover element 11. Additionally or alternatively, the sealing means/element 33 may be applied during the fastening 104 of the sleeve 30, as shown in FIG. 4.

FIGS. 7 and 8 show an electronics unit 12 for the actuating device 10 in one possible embodiment. In this case, a printed circuit board 13 of the electronics unit 12 is arranged in a frame 14, by means of which fastening to a cover element 11 can be simplified. For this purpose, the frame 14 has latching elements 14.1 into which the printed circuit board 13 can be clipped. Furthermore, the frame 14 preferably has one or more receiving means/elements 14.2 for a casting nozzle for casting compound 31.1, whereby the casting compound 31.1 can be advantageously distributed from an electronics inner side 12.1 over an electronics outer side 12.2. FIG. 7 shows the electronics unit 12 from the electronics inner side 12.1 and FIG. 8 shows the electronics unit 12 from the electronics outer side 12.2, which is opposite the electronics inner side 12.1. On the electronics outer side 12.2, sensor elements 21 of a sensor unit 20 are arranged in a regular pattern in a matrix-like manner on the printed circuit board 13. Each of the sensor elements 21 forms a capacitive surface. The sensor unit 20 is thus in particular a capacitive sensor, whereby a contactless actuation action 200 can be detected by the sensor unit 20. Furthermore, due to the matrix-like arrangement of the sensor elements 21, a direction of the actuation action 200 can be identified. For example, when a user brushes past a cover outer side 11.2 of the cover element 11, an electric field of the sensor elements 21 changes sequentially depending on the direction of the actuation action 200. Based on the sequence of detection by the sensor elements 21, the direction of the actuation action 200 can be inferred. For this purpose, the electronics unit 12 preferably has a control unit 25 for evaluating sensor signals from the sensor unit 20. Furthermore, an information unit 40 may be controllable by the control unit 25 in order to indicate to the user, for example, the detection of the actuation action 200 and/or the direction of the actuation action 200. In each case corresponding to the sensor elements 21, shielding elements 21.1 for shielding the sensor elements 21 are arranged in a matrix-like manner on the electronics inner side 12.1. In particular, an opposite shielding element 21.1 is associated with each of the sensor elements 21.

FIGS. 9 and 10 show an electronics unit 12 for the actuating device 10 in a further possible embodiment. Here, the electronics unit 12 corresponds essentially to the electronics unit 12 of the embodiment example of FIGS. 7 and 8, but the sensor elements 21 of the sensor unit 20 are designed/configured and arranged in a strip-like manner. While in the case of a matrix-like arrangement it may also be possible to detect several directions of an actuation action 200, the direction of the actuation action 200 can be detected along a straight line in the case of the strip-like sensor elements 21. However, the strip-like arrangement of the sensor elements 21 results in a larger capacitive field for the same installation space in each case, which can reduce false detection. On an electronics inner side 12.1, shield elements 21.1 are arranged in a strip-like manner corresponding to the strip-like design/configuration of the sensor elements 21.

In addition to the sensor unit 20, the electronics unit 12 preferably comprises a touch sensor 22, an identification means/element 23 and/or a proximity sensor 24, as shown in FIGS. 11 to 13. The identification means/element 23 may in particular comprise a radio element 23.1, in particular in the form of an electric coil, which may be printed as a circulating conductor track on the printed circuit board 13. The identification means/element 23 may enable contactless data exchange with an ID transponder of the user. Thus, the identification means/element 23 may preferably comprise an NFC interface, a BLE interface and/or a UWB interface. This enables identification and/or authentication of the user, in particular by vehicle electronics with which the identification means/element 23 can be brought into data communication connection. Depending on the identification of the user by the identification means/element 23, automatic locking and/or unlocking of the vehicle 1 may be provided. The touch sensor 22 may comprise, for example, an LDC sensor by means of which a deformation due to a touch or pressure on the cover element 11 can be detected. Depending on the actuation of the touch sensor 22, a further function of the vehicle 1, such as an automatic opening movement and/or an automatic closing movement of the vehicle part 2 or an emergency stop can be triggered when moving the vehicle part 2. By means of the in particular additional proximity sensor 24, it may be possible, for example, to send an alarm signal to further electronics components as a function of a detection of the approach of the user. Preferably, the touch sensor 22, the identification means/element 23 and/or the proximity sensor 24 are arranged in different conductor layers 13.1, 13.2 on the printed circuit board 13. Thereby, for example according to FIG. 11, the sensor unit 20 and the identification means/element 23 can be arranged together on a first conductor layer 13.1. The touch sensor 22 and the proximity sensor 24 can furthermore each be arranged on a further conductor layer 13.2 of the printed circuit board 13. By a multilayer design/configuration of the printed circuit board 13, a compact design/configuration of the actuating device 10 can be achieved, by which the actuating device 10 can advantageously be arranged on the cover element 11 in a small installation space. By means of the touch sensor 22, the identification means/element 23 and/or the proximity sensor 24, the actuating device 10 can thus provide a convenient operating option for the user with a high degree of automation.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS

1 Vehicle
1.1 Body surface
2 Vehicle part
2.1 B-pillar
3 Opening element
10 Actuating device
10.1 Intermediate level
11 Cover element
11.1 Cover inner side
11.2 Cover outer side
11.3 Counter-mounting interface
12 Electronics unit
12.1 Electronics inner side
12.2 Electronics outer side
13 Printed circuit board
13.1 First conductor layer
13.2 Second conductor layer
14 Frame
14.1 Latching elements
14.2 Receiving means/element
15 Electronics acceptance
20 Sensor unit
21 Sensor element
21.1 Shielding element
22 Touch sensor
23 Identification means/element
23.1 Radio element
24 Proximity sensor
25 Control unit
30 Sleeve
31 First sleeve section
31.1 Casting compound
31.2 Lid element 32 Second sleeve section
33 sealing means/element
34 Fastening interface
35 Electrical connection
40 Information unit
41 Window region
41.1 Window material
42 Light emitter
43 Separation section
50 Intermediate range
51 Intermediate element
100 Method
101 Providing 12
102 Arranging of 12
103 Closing of 31, 32
104 Fastening of 30
200 Actuation action

The invention claimed is:

1. A vehicle comprising:
a vehicle part with a cover element and
an actuating device for triggering a function of the vehicle by a user, having an electronics unit which has a sensor unit for detecting an actuation action of the user for triggering the function of the vehicle, an electronics outer side on which the user's actuation action can be detected by the sensor unit, and an electronics inner side which is opposite the electronics outer side, and
a first sleeve section for protecting the electronics inner side of the electronics unit and a second sleeve section for protecting the outside of the electronics unit,
wherein the first and second sleeve sections form a closed sleeve that is modularly disposed on the cover element,
wherein an elastic intermediate element is arranged in an intermediate range between the cover element and the actuating device, the actuating device being prestressed against the intermediate element or the actuating device being fastened to the cover element by the intermediate element.

2. A method for mounting an actuating device on a vehicle part of a vehicle according to claim 1, the method comprising:
Providing an electronics unit with a sensor unit for detecting an actuation action of the user for triggering the function of the vehicle, an electronics outer side on which the actuation action of the user can be detected by the sensor unit, and an electronics inner side which is opposite the electronics outer side,
Arranging the electronics unit between a first sleeve section for protecting the electronics inner side and a second sleeve section for protecting the electronics outer side,
Closing the first and second sleeve sections to form a closed sleeve of the actuation device,
Fastening the sleeve to a cover element of the vehicle part.

3. The method according to claim 2,
wherein
the sleeve is pre-stressed against a cover inner side of the cover element when the sleeve is fastened to the cover element.

4. The vehicle according to claim 1,
wherein
the first sleeve section has a casting compound or a lid element.

5. The vehicle according to claim 1,
wherein
the second sleeve section comprises a shell element, in particular in which the electronics unit is arranged.

6. The vehicle according to claim 1,
wherein
the electronics unit is bonded or welded to at least the first or second sleeve section.

7. The vehicle according to claim 1,
wherein
the electronics unit has a printed circuit board with at least one sensor element of the sensor unit for detecting the actuation action.

8. The vehicle according to claim 1,
wherein
the sensor unit has a plurality of sensor elements for detecting the actuation action, as a result of which a direction of the actuation action can be identified.

9. The vehicle according to claim 8,
wherein
the sensor elements are arranged in a regular pattern on the printed circuit board.

10. The vehicle according to claim 1,
wherein
the electronics unit has an information unit by means of which at least the detection of the actuation action can be confirmed to the user or a start of the actuation action can be signaled.

11. The vehicle according to claim 10,
wherein
the information unit is an optical information unit and the second sleeve section has at least one light transmitting window region through which an optical signal can be transmitted to the user by the information unit.

12. The vehicle according to claim 10,
wherein
the electronics unit has a control unit for evaluating sensor signals from the sensor unit and for actuating the information unit as a function of the sensor signals.

13. The vehicle according to claim 1,
wherein
the information unit has a plurality of light emitters for emitting an optical signal to the user, the light emitters being separated from one another at least in regions by light-impermeable separating sections.

14. The vehicle according to claim 1,
wherein
the electronics outer side of the electronics unit is covered with casting compound.

15. The vehicle according to claim 1,
wherein
at least the sensor unit, the electronics unit or the sleeve are at least partially symmetrical, as a result of which the actuating device can be optionally mounted on two opposite sides of the vehicle.

16. The vehicle according to claim 1,
wherein
the electronics unit has a touch sensor for detecting a pressure on the cover element, as a result of which a further function of the vehicle can be triggered.

17. The vehicle according to claim 1,
wherein
the electronics unit has an identification element for identifying the user.

18. The vehicle according to claim 1,
wherein
the electronics unit comprises a proximity sensor for detecting an approach of a user.

19. The vehicle according to claim 1,
wherein the printed circuit board has a plurality of conductor layers, at least the sensor unit being arranged on a first conductor layer and the touch sensor or the identifier being arranged on a further conductor layer.

\* \* \* \* \*